United States Patent [19]
Tomic et al.

[11] Patent Number: 6,063,224
[45] Date of Patent: May 16, 2000

[54] METHOD FOR SEPARATE CLOSURE EXTRUSION

[75] Inventors: Mladomir Tomic; Catherine E. Kettner, both of Appleton, Wis.

[73] Assignee: Reynolds Consumer Products, Inc., Appleton, Wis.

[21] Appl. No.: 09/083,555

[22] Filed: May 22, 1998

[51] Int. Cl.$^7$ .................................................. B29C 47/06
[52] U.S. Cl. ........................................ 156/244.25; 24/586
[58] Field of Search ........................... 156/244.11, 244.25, 156/66; 264/177.1; 24/586

[56] References Cited

U.S. PATENT DOCUMENTS

| | | | |
|---|---|---|---|
| 3,462,332 | 8/1969 | Goto | 156/244 |
| 3,904,468 | 9/1975 | Noguchi | 156/244 |
| 3,948,705 | 4/1976 | Ausnit | 156/73.4 |
| 4,191,230 | 3/1980 | Ausnit | 150/3 |
| 4,295,919 | 10/1981 | Sutrina et al. | 156/498 |
| 4,341,575 | 7/1982 | Herz | 156/66 |
| 4,428,788 | 1/1984 | Kamp | 156/66 |
| 4,601,694 | 7/1986 | Ausnit | 493/381 |
| 4,615,045 | 9/1986 | Siegel | 383/5 |
| 4,618,383 | 10/1986 | Herrington | 156/244.25 |
| 4,673,383 | 6/1987 | Bentsen | 156/244.25 |
| 4,676,851 | 6/1987 | Scheibner et al. | 156/66 |
| 4,691,372 | 9/1987 | Van Erden | 383/63 |
| 4,701,358 | 10/1987 | Behr et al. | 428/35 |
| 4,712,684 | 12/1987 | Boeckmann | 206/554 |
| 4,731,911 | 3/1988 | Gould | 24/587 |
| 4,755,248 | 7/1988 | Geiger et al. | 156/244.25 |
| 4,756,629 | 7/1988 | Tilman | 156/66 |
| 4,787,755 | 11/1988 | Branson | 383/65 |
| 4,854,017 | 8/1989 | Kamp | 24/587 |
| 4,929,487 | 5/1990 | Tilman et al. | 428/163 |
| 5,012,561 | 5/1991 | Porchia et al. | 24/576 |
| 5,053,091 | 10/1991 | Giljam et al. | 156/66 |
| 5,071,689 | 12/1991 | Tilman | 383/63 |
| 5,103,546 | 4/1992 | Rossini et al. | 29/450 |
| 5,188,461 | 2/1993 | Sorensen | 156/66 |
| 5,242,516 | 9/1993 | Custer | 156/244.11 |
| 5,382,094 | 1/1995 | Ausnit | 383/65 |
| 5,573,614 | 11/1996 | Tilman | 156/66 |

FOREIGN PATENT DOCUMENTS

| | | | |
|---|---|---|---|
| 484599 | 5/1992 | European Pat. Off. | 156/66 |
| 0 814 026 A2 | 12/1997 | European Pat. Off. . | |
| 0 908 294 A2 | 4/1999 | European Pat. Off. . | |
| 2 311 274 | 9/1997 | United Kingdom . | |

*Primary Examiner*—Daniel Stemmer
*Attorney, Agent, or Firm*—Alan M. Biddison

[57] ABSTRACT

A method of manufacturing a resealable closure mechanism includes separately extruding the interlocking closure member from its respective base strip. The interlocking closure member is cooled prior to bonding the base strip to the interlocking closure member. Bonding is accomplished by either heat sealing, adhering, pouring molten polymeric material, or ultrasonic sealing.

11 Claims, 4 Drawing Sheets

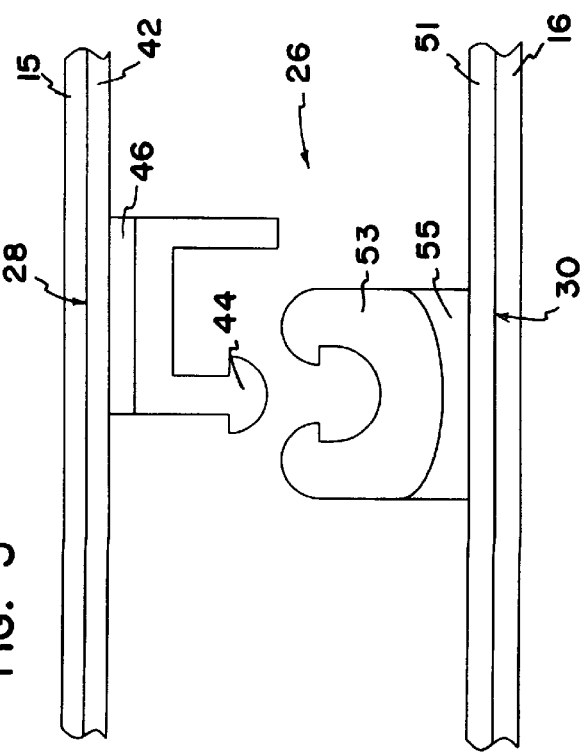
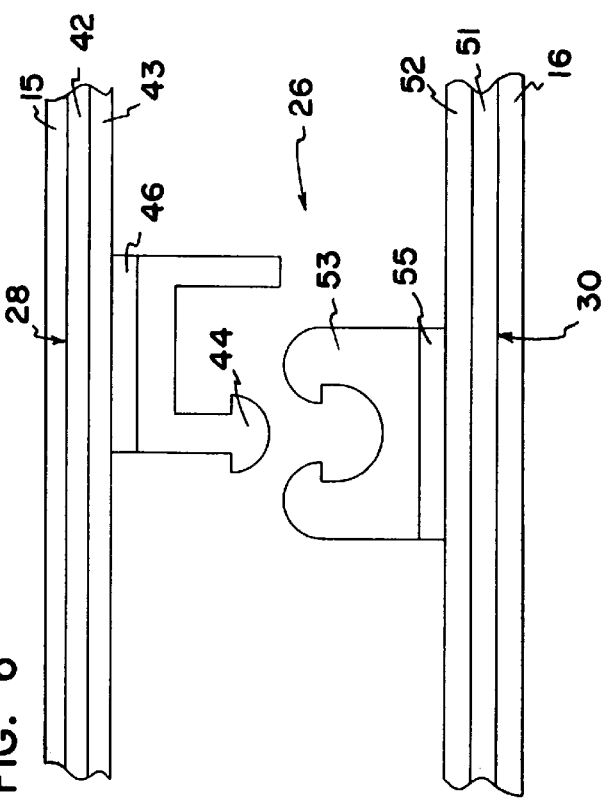

METHOD FOR SEPARATE CLOSURE EXTRUSION

FIELD OF THE INVENTION

The present invention generally relates to closure arrangements for polymeric packages and, in particular, to extrusion of closure arrangements.

BACKGROUND

Many packaging applications use resealable containers to store various types of articles and materials. These packages may be used to store and ship food products, non-food consumer goods, medical supplies, waste materials, and many other articles.

Resealable packages are convenient in that they can be closed and resealed after the initial opening to preserve the enclosed contents. The need to locate a storage container for the unused portion of the products in the package is thus avoided. As such, providing products in resealable packages appreciably enhances the marketability of those products.

The resealable closure mechanism is often produced as a separate item from the package and is attached to and made integral with the package at a later point in the manufacturing process by a heat and pressure sealing process. Each separate closure profile includes a base strip and an interlocking member.

One closure profile may have a rib or male member and the other, a mating groove or female member. The male or female member extends from the front face of the base strip. The rib and groove form a pressure-fastenable and releasable closure mechanism. The back side or sometimes an extended portion of the front face of the base strip, is sealed to the package film so that the closure mechanism is disposed between the package walls adjacent to the openable side of the package.

Typically, the base strip and interlocking closure member are extruded in a single extrusion. One disadvantage of this process is that the interlocking closure member and the base strip have to be the same material. Another disadvantage is that different package uses require different base strip designs. When the closure member is extruded with the base stripe the closure member must also be redesigned.

SUMMARY OF THE INVENTION

In one aspect of the present invention, one example embodiment involves a method of manufacturing a resealable closure mechanism for use with a polymeric package. The method includes extruding an interlocking closure member from a first resin through a first die plate by a first extruder, cooling the interlocking closure member, extruding a base strip from a second resin through a second die plate by a second extruder, and bonding the base strip to the interlocking closure member.

According to another aspect of the present invention, another example embodiment involves a method of manufacturing a resealable closure mechanism for use with a polymeric package. The method includes extruding a female interlocking closure member from a first resin through a first die plate by a first extruder, extruding a male interlocking closure member from a second resin through a second die plate by a second extruder, cooling the female and male interlocking closure members, interlocking the female and male interlocking closure members extruding a first base strip from a third resin through a third die plate by a third extruder, extruding a second base strip from a fourth resin through a fourth die plate by a fourth extruder, bonding the first base strip to the female interlocking closure member, and bonding the second base strip to the male interlocking closure member.

The above summary of the present invention is not intended to describe each illustrated embodiment or every implementation of the present invention. The figures and the detailed description that follow more particularly exemplify these embodiments.

BRIEF DESCRIPTION OF THE DRAWINGS

The invention may be more completely understood in consideration of the detailed description of various embodiments of the invention that follows in connection with the accompanying drawings in which:

FIG. 5 is a fragmented, cross-sectional, somewhat schematic view of a resealable closure mechanism according to a third example embodiment of the present invention; and FIG. 6 is a fragmented, cross-sectional, somewhat schematic view of a resealable closure mechanism, according to a fourth example embodiment of the present invention.

Figure 1:
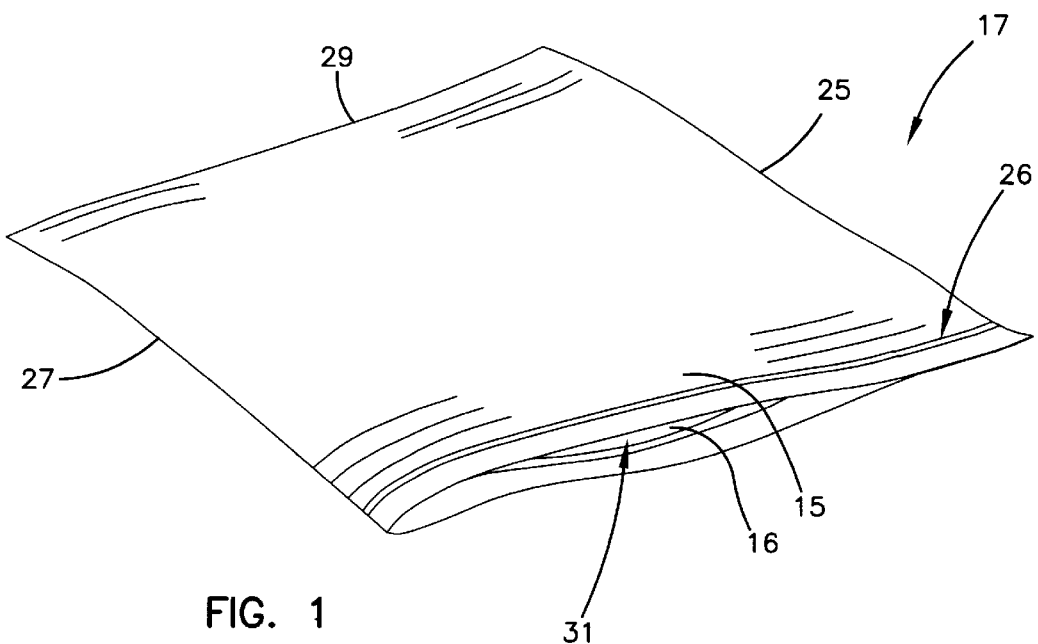
FIG. 1 is a perspective view of a flexible, resealable package according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to a variety of packaging arrangements. The invention has been found to be particularly advantageous for manufacturing resealable closure mechanisms. An appreciation of various aspects of the invention is best gained through a discussion of an application example for such a packaging arrangement.

Figure 2:
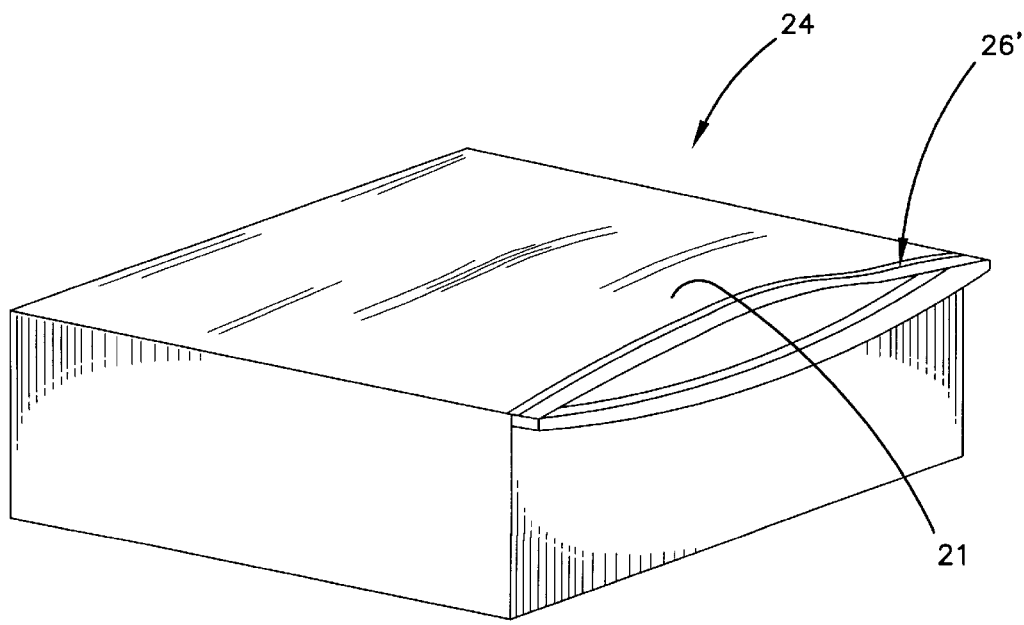
FIG. 2 is a perspective view of a rigid, resealable package also according to an example embodiment of the present invention.

According to an example embodiment of the present invention, an interlocking closure member is extruded separate from its respective base strip. FIGS. 1 and 2 illustrate example types of packages 17, 24 that benefit from use of such resealable closure mechanisms.

FIG. 1 illustrates an example packaging arrangement in the form of a resealable, flexible package 17 having a zipper-type closure mechanism 26 constructed in accordance with the present invention. The flexible package 17 includes first and second opposed panel sections 15, 16 made from a flexible, polymeric film. For some manufacturing applications, the first and second panel sections 15, 16 are heat-sealed together along two edges 25, 27 and meet at a fold line in order to form a three-edged containment section for a product within the interior of the package 17. The fold line comprises the bottom edge 29. Alternatively, two separate panel sections 15, 16 of polymeric film may be used and heat-sealed together along the two edges 25, 27 and at the bottom 29. Access is provided to the interior of the package 17 through a mouth 31. In other implementations the package 17 includes tear strings and/or notches at the mouth 31 to assist with opening the package 17.

FIG. 2 is a perspective view depicting a rigid resealable package 24. The rigid resealable package 24 has the same basic features as the flexible resealable package 17 of FIG. 1. The package 24, however, has only one flexible top side 21. The remaining five sides are rigid.

A resealable closure mechanism 26 is illustrated in FIG. 1 at the opening of the flexible package 17. A similar closure mechanism 26' is illustrated in FIG. 2. Each closure mechanism 26 or 26' extends the width of the package 17 or 24. Each closure mechanism 26 or 26' can be one of a variety of closure mechanisms. In the particular embodiment illustrated in FIG. 3, the resealable closure mechanism 26 of FIG. 1 is shown in the specific form of a zipper-type mechanism. The resealable closure mechanism 26 includes an elongated male closure profile 28 and an elongated female closure profile 30. The male closure profile 28 is comprised of a base strip 42 and an interlocking closure member 44. The base strip 42 is attached to the first package film 15. The female closure profile 30 is likewise comprised of a base strip 51 and an interlocking closure member 53. The base strip 51 is attached to the second package film 16. A resealable closure mechanism such as this is described in U.S. Pat. No. 5,486,051, hereby incorporated by reference.

Figure 3:
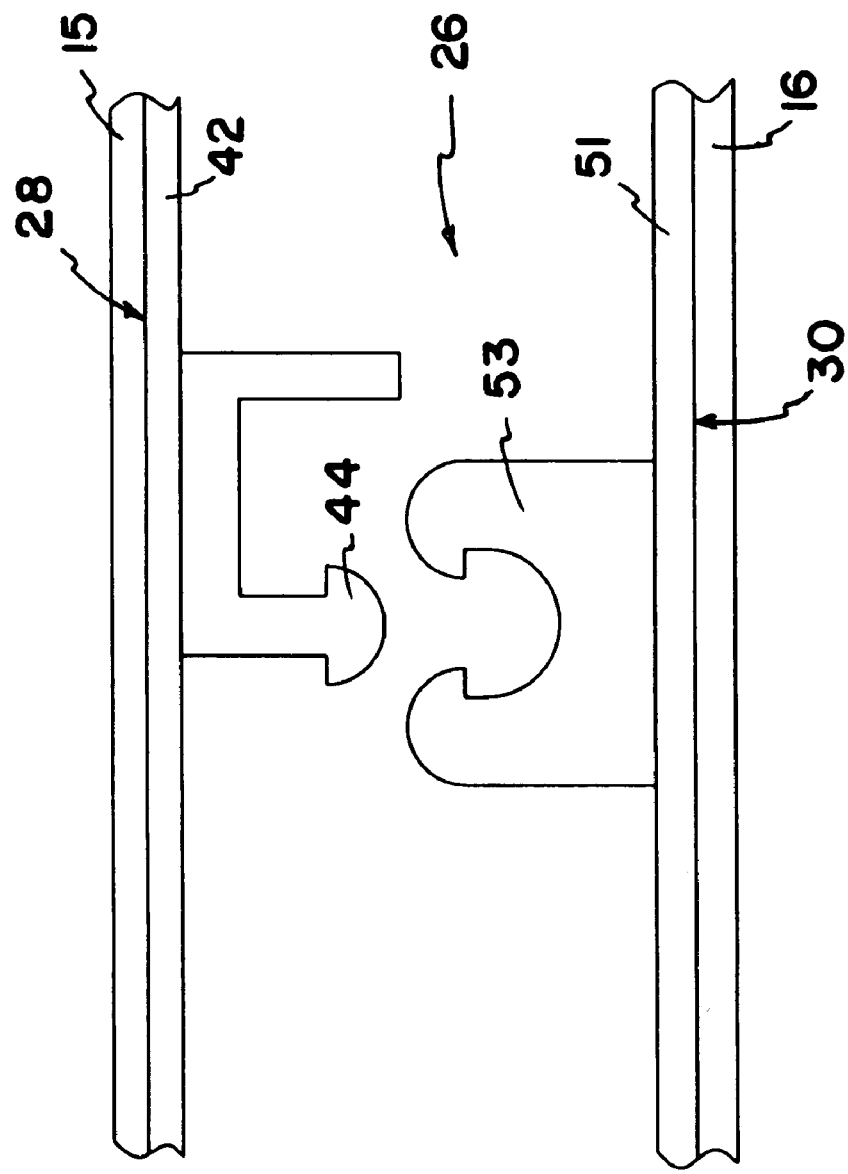
FIG. 3 is a fragmented, cross-sectional, somewhat schematic view of a resealable closure mechanism, according to a first example embodiment of the present invention.

In the example embodiment illustrated in FIG. 3, the male and female closure profiles 28, 30 are extruded separately from the base strips 42, 51. The male closure profile 28 is manufactured by extruding the interlocking closure member 44 through a die plate by an extruder. This extruder carries the molten material for forming the interlocking closure member 44. As is well-known in the art, the die plate includes input ports, output ports, and channels connecting these input ports to output ports. The extruder feeds the molten material to different input ports, and the channels are designed to configure the molten material into the shape of the interlocking closure member 44. An extrusion process such as this is described in U.S. Pat. No. 5,411,692, hereby incorporated by reference. Likewise, the female closure profile 30 is manufactured by extruding the interlocking closure member 53 through a die plate by an extruder. This extruder carries the molten material for forming the interlocking closure member 53. The extruder feeds the molten material to different input ports, and the channels are designed to configure the molten material into the shape of the interlocking closure member 53. After the male and female interlocking closure members 44, 53 have cooled from the extrusion process, the closure members 44, 53 are interlocked.

The base strips 42, 51 are separately extruded through die plates by extruders. These extruders carry the molten materials for forming the base strips 42, 51. The extruders feed the molten materials to different input ports, and the channels are designed to configure the molten materials into the shapes of the base strips 41, 51. The base strips 42, 51 are attached to the interlocking closure members 44, 53, respectively, at a later time using one of a variety of methods. The base strips 42, 51 can be attached to the closure members 44, 53, respectively, immediately after extrusion, using the heat of extrusion to bond the base strips 42, 51 to the closure members 44, 53. Alternatively, an adhesive, such as a strip of tape or glue, could be used to adhere the base strips 42, 51 to the closure members 44, 53, respectively.

Typically, the interlocking closure members 44, 53 are extruded, interlocked, and coiled onto a spool for storage and later use. The base strips 42, 51 are also extruded and coiled onto a spool for storage and later use. Alternatively, the interlocking closure members 44, 53 and the base strips 42, 51 are extruded, interlocked, and attached to one another in the manufacturing line.

Generally, the closure profiles 28, 30 are extruded from a polymeric resin such as polyethylene. Because the interlocking closure members 44, 53 and the base strips 42, 51 are extruded separately, the closure members 44, 53 can be extruded from one material while the base strips 42, 51 are extruded from another material. For example, the interlocking closure members 44, 53 are extruded from polypropylene, and the base strips 42, 51 are extruded from polyethylene. This process is advantageous because it allows the interlocking closure members 44, 53 to be extruded from a material that best retains the shape of the closure members 44, 53 and facilitates the engagement of the interlocking closure members 44, 53, while also allowing the base strips 42, 51 to be extruded from a material that is compatible with the package design.

The separate extrusion of the interlocking closure members 44, 53 and the respective base strips 42, 51 is advantageous because it allows standardization of the interlocking closure members. For example, the male and female interlocking closure members 44, 53 illustrated in FIG. 3 may be used for all package applications. However, the respective base strips 42, 51 are varied in composition and design according to package type and use. Different packages require different base strip designs. By separately extruding the interlocking closure members 44, 53 from the respective base strips 42, 51, the manufacturer avoids redesigning the interlocking closure members 44, 53 whenever the respective base strips 42, 51 are redesigned. This process is also advantageous because it allows for easy storage of the profiles for out-of-line extrusions.

Figure 4:
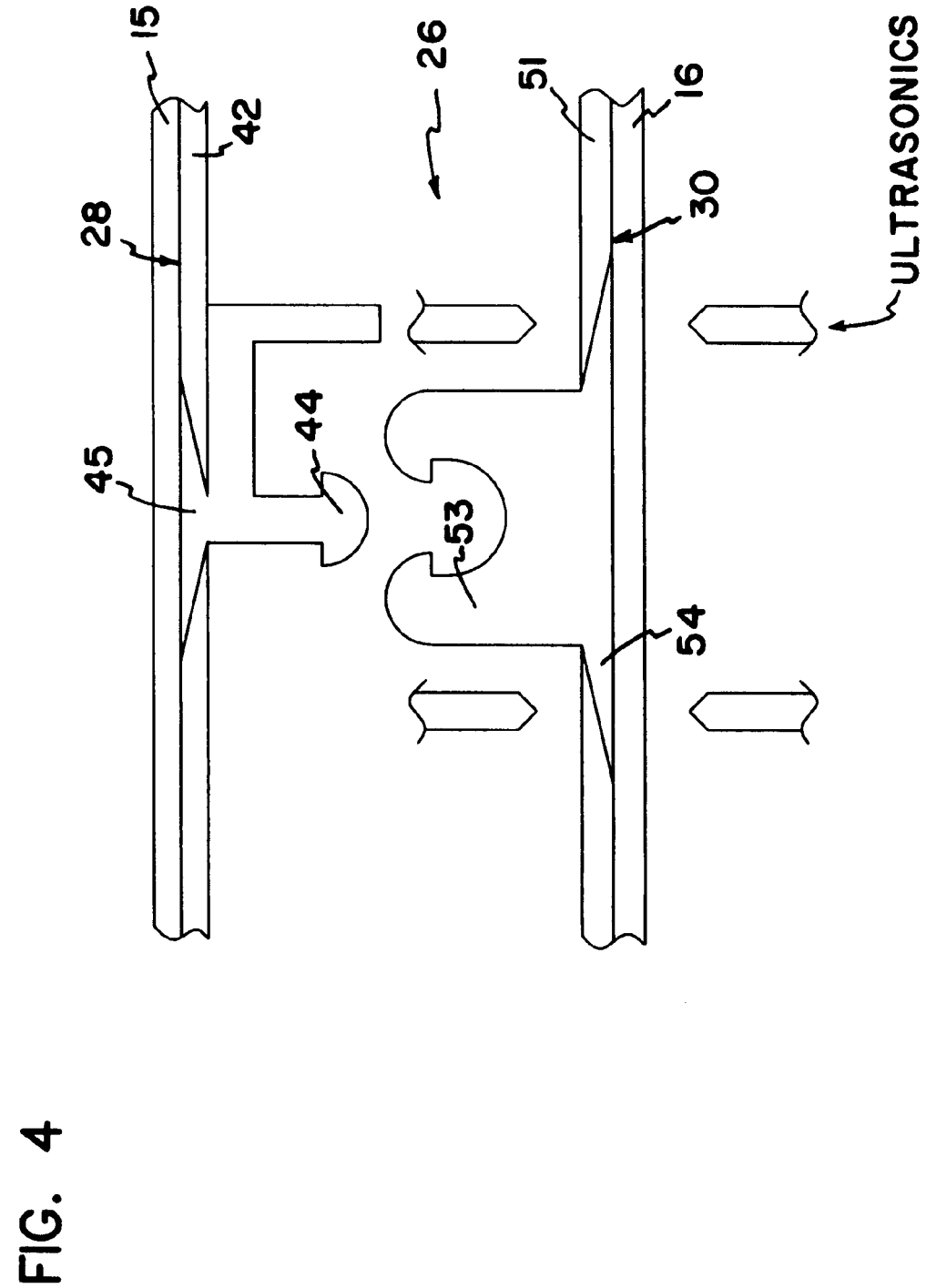
FIG. 4 is a fragmented, cross-sectional, somewhat schematic view of a resealable closure mechanism, according to a second example embodiment of the present invention.

Attention is directed to FIG. 4. In a second example embodiment, the female interlocking closure member 53 has a triangular-shaped base 54, and the male interlocking closure member 44 has a triangular-shaped base 45. The triangular bases 45, 54 support the interlocking closure members 44, 53, respectively. The bases 45, 54 help to maintain the closure members 44, 53 perpendicular to the base strips 42, 51, respectively. This support makes the closure mechanism 26 stronger and more effective. The bases 45, 54 also provide a thickened area that acts as a heat sink, protecting the closure members 44, 53 from distortion when the closure profiles 28, 30 are heat-sealed to the package films 15, 16.

In the example embodiment illustrated, an ultrasonic seal is used to attach the interlocking closure member 53 to its base strip 51. In this process, ultrasonics are used to bond the interlocking closure member 53 to the base strip 51. The same process is used to bond the male interlocking closure member 44 to its base strip 42. Alternatively, a molten polymeric material can be used. The bases 45, 54 allow the interlocking closure members 44, 53 to be attached to the base strips 42, 51, respectively, with a molten polymeric material that is laid between the interlocking closure members 44, 53 and the base strips 42, 51, respectively. An example of such a polymeric material is polyethylene.

Attention is directed to FIG. 5. An adhesive layer 46 or 55 is coextruded with the interlocking closure members 44, 53, respectively. The closure members 44, 53 are extruded through a die plate by an extruder. The adhesive layers 46, 55 are extruded through the die plate by a different extruder carrying molten adhesive material for forming the adhesive layers 46, 55. In this process, the adhesive layers 46, 55 are bonded to the closure members 44, 53. The adhesive layers 46, 55 facilitate bonding between the closure members 44, 53 and the base strips 42, 51, respectively.

Attention is directed to FIG. 6. In another example embodiment, an adhesive layer 43 or 52 is coextruded with the base strips 42, 51 to further facilitate the bonding between the closure members 44, 53 and the base strips 42, 51, respectively.

The adhesive layers comprise an adhesive such as ethylene vinyl acetate, ethylene acrylic acid, a polymer rubber blend, and the like. These materials bond at a temperature between 125 degrees Fahrenheit to 260 degrees Fahrenheit. This temperature is sufficiently less than the melting point of the closure members 44, 53. To bond the base strips 42, 51 to the closure members 44, 53, the adhesive layers 46, 55, 43, and 52 are heated to between 125 degrees Fahrenheit to 260 degrees Fahrenheit. This bonds the base strips 42, 51 to the closure members 44, 53, respectively, without distorting the closure members 44, 53. Alternatively, the adhesive may be a "cold seal" adhesive that is activated by applying force. Adhesive can be applied to both surfaces by gravure or flexographic methods. Both surfaces are "dry" to the touch, but bond when pressed together.

Prior to initially opening a package incorporating the closure arrangements shown in FIGS. 3, 4, 5, or 6, the closure profiles 28, 30 are interlocked with each other. To open the package 17, the interlocked closure profiles 28, 30 are detached from each other by grabbing onto the first and second films 15, 16 and pulling them apart.

The above specification and examples are believed to provide a complete description of the manufacture and use of particular embodiments of the invention. Many embodiments of the invention can be made without departing from the spirit and scope of the invention.

We claim:

1. A method of manufacturing a resealable closure mechanism for later attachment to a first package film and to a second package film, the resealable closure mechanism and first and second package films providing a polymeric package, comprising:

extruding a female interlocking closure member from a first resin through a first die plate by a first extruder;

extruding a male interlocking closure member from a second resin through a second die plate by a second extruder;

cooling the female and male interlocking closure members;

extruding a first base strip from a third resin through a third die plate by a third extruder;

extruding a second base strip from a fourth resin through a fourth die plate by a fourth extruder;

bonding the first base strip to the cooled female interlocking closure member;

bonding the second base strip to the cooled male interlocking closure member; and interlocking the female and male interlocking closure members, the resealable closure mechanism thus formed being for later attachment to a first package film and a second package film.

2. A method of manufacturing a resealable closure mechanism according to claim 1, further comprising a step of coiling the interlocked female and male interlocking closure members onto a spool.

3. A method of manufacturing a resealable closure mechanism according to claim 1, further comprising steps of:

coextruding a first adhesive layer with the female interlocking closure member through the first die plate by a fifth extruder; and coextruding a second adhesive layer with the male interlocking closure member through the second die plate by a sixth extruder.

4. A method of manufacturing a resealable closure mechanism according to claim 3, further comprising steps of:

coextruding a third adhesive layer with the first base strip through the third die plate by a seventh extruder; and coextruding a fourth adhesive layer with the second base strip through the fourth die plate by an eighth extruder.

5. A method of manufacturing a resealable closure mechanism according to claim 4, wherein the steps of coextruding first second, third, and fourth adhesive layers include coextruding the first, second, third, and fourth adhesive layers comprised of a material selected from the group consisting of ethylene vinyl acetate, ethylene acrylic acid, and a polymer rubber blend.

6. A method of manufacturing a resealable closure mechanism according to claim 1, wherein the step of bonding includes at least one of heat sealing, adhering, pouring molten polymeric material, and ultrasonic sealing.

7. A method of manufacturing a resealable closure mechanism according to claim 1, wherein:

the step of extruding a female interlocking closure member includes extruding the female interlocking closure member from the first resin comprising a polymeric material selected from the group consisting of polyethylene and polypropylene;

the step of extruding a male interlocking closure member includes extruding the male interlocking closure member from the second resin comprising a polymeric material selected from the group consisting of polyethylene and polypropylene;

the step of extruding a first base strip includes extruding the first base strip from the third resin comprising a polymeric material selected from the group consisting of polyethylene and polypropylene; and the stop of extruding a second base strip includes extruding the second base strip from a fourth resin comprising a polymeric material selected from the group consisting of polyethylene and polypropylene.

8. A method of manufacturing a resealable closure mechanism according to claim 7, wherein:

the step of extruding a female interlocking closure member includes extruding the female interlocking closure member from polypropylene;

the step of extruding a male interlocking closure member includes extruding the male interlocking closure member from polypropylene;

the step of extruding a first base strip includes extruding the first base strip from polyethylene; and the step of extruding a second base strip includes extruding the second base strip from polyethylene.

9. A method of manufacturing a resealable closure mechanism according to claim 1, wherein:

the step of extruding a female interlocking closure member includes extruding the female interlocking closure member from the first resin comprising a first material;

the step of extruding a male interlocking closure member includes extruding the male interlocking closure member from the second resin comprising the first material;

the step of extruding a first base strip includes extruding the first base strip from the third resin comprising a second material different from the first material; and the step of extruding a second base strip includes extruding the second base strip from the fourth resin comprising the second material.

10. A method of manufacturing a resealable closure mechanism according to claim 9, wherein the first and second resins comprise polypropylene and the third and fourth resins comprise polyethylene.

11. A method of manufacturing a resealable closure mechanism according to claim 1, wherein the step of interlocking the female and male interlocking closure members is done before the step of bonding the first base strip to the female interlocking closure member and the step of bonding the second base strip to the male interlocking closure member.

* * * * *